(12) United States Patent
Kixmoeller

(10) Patent No.: US 7,419,129 B2
(45) Date of Patent: Sep. 2, 2008

(54) SLIDING HOLDING DEVICE FOR A COOKING CONTAINER LID

(75) Inventor: Kenneth Browne Kixmoeller, Birchwood Village, MN (US)

(73) Assignee: Jaguar Marketing Services, Inc., Birchwood Village, MN (US)

( * ) Notice: Subject to any disclaimer, the term of this patent is extended or adjusted under 35 U.S.C. 154(b) by 395 days.

(21) Appl. No.: 10/804,317

(22) Filed: Mar. 18, 2004

(65) Prior Publication Data
US 2005/0205742 A1    Sep. 22, 2005

(51) Int. Cl.
A47F 7/14    (2006.01)
(52) U.S. Cl. .................. 248/488; 248/490; 248/316.4
(58) Field of Classification Search .......... 248/448, 248/449, 488, 490, 682, 316.4, 451, 442, 248/115, 477, 478; 211/41.7, 87.01; D6/566
See application file for complete search history.

(56) References Cited

U.S. PATENT DOCUMENTS

| | | | | |
|---|---|---|---|---|
| 1,884,370 | A | * | 10/1932 | Swanson .................... 248/310 |
| 2,300,781 | A | | 11/1942 | Gilley |
| 2,367,256 | A | | 1/1945 | Atkins |
| 2,466,149 | A | | 4/1949 | Burg |
| 2,614,778 | A | * | 10/1952 | Graves ....................... 248/490 |
| 2,634,865 | A | | 4/1953 | Geheb |
| 3,176,943 | A | * | 4/1965 | Hughes ...................... 248/490 |
| 3,219,182 | A | | 11/1965 | Cornwell, Jr. |
| 4,106,742 | A | | 8/1978 | Miller et al. |
| 4,223,864 | A | * | 9/1980 | Harlow ....................... 248/490 |
| 4,364,537 | A | * | 12/1982 | Helzer ........................ 248/448 |
| 4,473,207 | A | * | 9/1984 | Nascher ...................... 248/490 |
| 4,542,876 | A | * | 9/1985 | Hogg .......................... 248/491 |
| 4,776,469 | A | | 10/1988 | Geleziunas |
| 4,998,627 | A | | 3/1991 | Elder |
| 5,242,060 | A | | 9/1993 | Chiang et al. |
| D361,713 | S | | 8/1995 | Grant |
| 5,711,433 | A | | 1/1998 | Smith |
| 6,533,128 | B1 | | 3/2003 | Beneway |
| 6,601,805 | B1 | | 8/2003 | Kapp |

OTHER PUBLICATIONS

Welcome to Get Organized—Organization Products to Simplify Your Life!, http://www.shopgetorganized.com/prodetail.asp?itemNo=0700&ID=KI, pp. 1-2, (last date visited on Jun. 10, 2004) (lid organizer).

3-Way Lid Organizer, http://store.yahoo.com/spacesavers/3waylidor.html, p. 1, (last date visited on Jun. 10, 2004) (3-way lid organizer).

(Continued)

*Primary Examiner*—Gwendolyn Baxter
(74) *Attorney, Agent, or Firm*—Heimbecher & Assoc., LLC (57) ABSTRACT

A lid holding device is composed of an elongate sliding member held within a mounting base. The sliding member travels linearly with respect to the mounting base. The sliding member has a retainer clip. The mounting base has a pair of retainer clips connected to wing sections angling outward from the mounting base. The retainer clips engage the rim of a lid to hold it in place. The sliding member can travel to increase the distance between the retainer clips, thus accommodating a wide range of lid diameters.

17 Claims, 9 Drawing Sheets

OTHER PUBLICATIONS

Cookware Rack—Lids, http://www.stacksandstacks.com/html/55077_cookware-rack-lids.htm, pp. 1-2, (last date visited on Jun. 10, 2004) (cookware rack—lids).

Pan Lid Organiser, http://www.seemans.com/kitchen/pan_pan_lid_organizer.htm, pp. 1-2, (last date visited on Jun. 10, 2004) (pan lid organiser).

Undersink Organizer—Lid Tray, http://www.stacksandstacks.com/html/10171_undersink-organizer-lit-tray.htm, (last date visited on Jun. 10, 2004) (undersink organizer—lid tray).

Cookware Rack—Storage Stand, http://www.stacksandstacks.com/html/10615_cookware-rack-storage-stand.htm, pp. 1-2, (last date visited on Jun. 10, 2004) (cookware rack—storage stand).

Platter and Tray Rack—Expandable—Storage and Organizing Catalog, http://www.kitchen-storage.net/buy-2421720.aspx, pp. 1-2, (last date visited on Jun. 10, 2004) (platter and tray rack expandable).

Bakeware Rack—Lid Rack Cabinet Organizer, http://store.yahoo.com/organizeeverything1/bakewarerack.html, pp. 1, (last date visited on Jun. 10, 2004 (bakeware rack—lid rack cabinet organizer).

Kitchen Etc. -> Lee Rowan—Deluxe Lid Rack—, http://www.kitchenetc.com/Propducts.cfm?sku=000543521, pp. 1-2, (last date visited on Jun. 10, 2004) (deluxe lid rack).

Kitchen Etc. -> Lee Rowan—Pot Lid Storage Rack—, http://www.kitchenetc.com/products.cfm?sku=000894006, pp. 1-2, (last date visited on Jun. 10, 2004) (pot lid storage rack).

The Lid Locker Organizer, http://store.yahoo.com/organizeeverything1/lidstorandor.html, p. 1, (last date visited on Jun. 10, 2004) (the lid locker organizer).

Lid Organizer, http://www.containerstore.com/browse/Product.jhtml?PRODID=60279&CATID=185, p. 1, (last date visited on Jun. 10, 2004) (lid organizer).

Shelf—Placemat Holder, http://www.stacksandstacks.com/html/10535_shelf-placemat-holder.htm, pp. 1-2 (last date visited on Jun. 10, 2004) (shelf—placemat holder).

JK Adams Wall Mount Pot Rack—JK-PRW-01—Kitchenshop.com, http://www.kitchenshop.com/catalog/JK-PRW-01.shtml, pp. 1-2, (last date visited on Jun. 10, 2004) (JK Adams wall mount pot rack).

Cookware Lid Rack—Cooking.com, http://www.cooking.com/products/shprodde.asp?SKU=198099, pp. 1-2, (last date visited on Jun. 10, 2004) (cookware lid rack).

Lid Holder—Storage and Organizing Catalog, http://www.kitchen-storage.net/buy-1421903.aspx, pp. 1-2, (last date visited on Jun. 10, 2004) (lid holder).

Cookware Rack—Bakeware—Storage and Organizing Catalog, http://www.kitchen-storage.net/buy-1409556.aspx, pp. 1-2, (last date visited on Jun. 10, 2004) (cookware rack—bakeware).

Wall & Door Lid Rack, http://www.containerstore.com/browse/Product.jhtml?PRODID=60278&CATID=185, p. 1, (last date visited on Jun. 10, 2004) (wall & door lid rack).

Pull-Out Lid Organizer, http://www.containerstore.com/browse/Product.jhtml?PRODID=60323&CATID=186, p. 1, (last date visited on Jun. 10, 2004) (pull-out lid organizer).

Kitchen Etc. -> Lee Rowan—Plastic Lid Organizer—, http://www.kitchenetc.com/Product.cfm?sku=000543576, pp. 1-2, (last date visited on Jun. 10, 2004) (plastic lid organizer).

JK Adams Overhead Pot Rack—JK-PRC-02—Kitchenshop.com, http://www.kitchenshop.com/catalog/JK-PRC-02.shtml, pp. 1-2, (last date visited on Jun. 10, 2004) (JK Adams overhead pot rack).

Wall Mounted Pot Rack Dual Bar 36"Chrome—CH-PR-40229—Kitchenshop.com, http://www.kitchenshop.com/catalog/ch-pr-40229.shtml, pp. 1-2, (last date visited on Jun. 10, 2004) (wall mounted pot rack dual bar 36"chrome).

* cited by examiner

SLIDING HOLDING DEVICE FOR A COOKING CONTAINER LID

BACKGROUND OF THE INVENTION

1. Field of the Invention

This invention relates to storage devices for storing kitchen utensils. In particular, the invention is a device for holding a lid for a pot, pan, or other cooking dish.

2. Description of the Related Art

One problem often encountered while cooking is the need to momentarily uncover a pot, pan, or other cooking container for stirring or otherwise manipulating the food being prepared. A user generally needs one hand for removing and holding the lid, another hand for holding the pot or pan, and a third hand for operating the spoon or spatula to manipulate the food. Since most cooks only have two hands, this means that they have to find a location to temporarily place the lid. The available "places" usually include an unused burner (not always available), the counter (not always advisable for a hot lid and not always clean), the sink (often too distant or cluttered), or precariously balanced against an adjoining wall or appliance. This is commonly a prelude to a messy disaster.

Many different storage solutions have been proposed in the past with limited success. Problems with storage of lids stem from the fact that lids are bulky, irregularly shaped, and in general, consume an inordinate amount of space for their size. A first solution for this problem has been to store the lids on the pans. However, this means a user cannot "nest" pans and therefore this method consumes a huge amount of storage space, more than is generally available in most kitchens. Another option is to stack lids in a drawer. The drawbacks to this method are that the lids get banged up and are hard to find.

A third solution proposed in the past is to install "drawer-type" storage systems. Many of these designs are reasonably flexible in the type of lids they will accommodate, except for lids with high profiles such as a roasting pan. Such high profile lids will not fit in the holding slots that these drawers all use for holding lids upright. Also, the drawers take up a large amount of cabinet space and only store a few lids. Even the manufacturers' promotional photos show that these will only store a handful of lids (a few more if the lids are all very small). Most cooks have at least a dozen pans of various sizes, so would need three or four sets of these drawers.

A further option is to use "free-standing" lid storage devices, of which there are many. The advantages of a free-standing device are that it is generally inexpensive and can accept a wide variety of lids. However, there are also a number of disadvantages. First, the lids always need to be arranged small to big, front to back, otherwise a user cannot see the small lids. The free-standing devices are also very cumbersome and unstable when they are full of lids. As a result, they do not move well, and can fall or tip over when moving lids in or out. If placed on a counter they take up a large amount of space. When placed in a cabinet, it is difficult to retrieve a large lid from the back because of the space constraint between the lids in front and the top of the cabinet or the shelf above the device. Also, the lid handles tend to catch on other lids when removed from the device, so a user generally cannot remove lids with only one hand.

Some upscale and professional kitchens use pot racks usually mounted over a preparation surface, such as an island. Most of these pot racks have no ability to store lids. The only practical place to place lids is on a shelf on top of the pot rack. This shelf is generally too high for a user to reach a lid without a stepladder.

The most plentiful storage space in most kitchens seems to be vertical—cabinet doors, backs, and sides. There are a few devices that seek to take advantage of these surfaces. The few examples in the prior art are inflexible in the size and profile of the lids they will store. Such device also stick out a long way beyond the mounting surface, thereby consuming precious horizontal surface area provided by the shelves within the cabinets. Custom hooks or clasps are also often mounted to hold lids on these surfaces. This can be a solution until the purchase of new or replacement pots and pans.

Ideally, a device to hold a hot lid should do so without damage to the device, the lid, or the mounting surface. The device should also be easy enough to use such that a user can attach the lid to the holding device quickly and with one hand. Such a device should also be able to accommodate lids of multiple sizes and configurations, whatever the cook is using at the moment. The device should further be easy to clean after cooking. It would also be desirable if the holding device were attractive enough to compliment the aesthetics of a well-designed kitchen.

The information included in this Background section of the specification, including any references cited herein and any description or discussion thereof, is included for technical reference purposes only and is not to be regarded subject matter by which the scope of the invention is to be bound.

SUMMARY OF THE INVENTION

The present invention is a device for handling and storing lids of cooking pots, pans, or other dishes in a consumer or commercial kitchen. The device is designed for a busy cook who needs to place a hot lid within easy reach, but out of the way while cooking, and as an attractive, flexible means to store lids.

The lid holding device of the present invention is an attractive, strong, and flexible clasping device that takes advantage of available vertical storage spaces. A user can mount the lid holding device on most available vertical surfaces, including walls, cabinet doors, interior cabinet walls, even the backsplash over the stove. A user can also use the lid holding device to display decorative lids or the most commonly used lids in work areas. In one embodiment incorporating a spring, a lid may even be stored on the underside of a cabinet or shelf, thus saving space which may be a scarce commodity in a kitchen.

The lid holding device of the present invention can accommodate a wide variety of lids of any profile. The lid holding device may accommodate lids with diameters of 6 in. or less to over 12 in. or more depending upon the chosen design parameters. The lid holding device can accommodate round lids, oval lids, square lids, and rectangular lids. It can even hold flat rectangular objects like a small griddle pan. The lid holding device is also able to hold lids of light or heavy material.

The lid holding device is composed of two primary pieces. The first may be simply described as an inverted "V-shaped" base with protruding clasps to hold the bottom of the rim of the lid, presuming the lid holding device is mounted on a vertical surface. The "V" base is bisected by a vertical slide with a clasp at the top that is raised by the user and lowers by gravity to grab and hold the top edge of the lid. To attach a lid to the lid holding device, a user holds the lid vertically, slips the top edge under the top clasp of the vertical slide, slides it up far enough to fit the diameter of the lid, and rests the bottom edge of the lid on the clasps of the V-shaped base. The vertical member slides down to hold the top rim of the lid securely. The whole operation works with a flick of the wrist in an instant. The lid holding device may be made of metal or plastic, for example, for storage of lids only. The vertical slide member may also be retracted via an integrated spring in lieu of gravity.

In one embodiment, the inventive device for holding a lid is composed of a mounting base having at least one retaining member and a sliding member operably connected with the mounting base. The sliding member further has a second retaining member. The sliding member travels linearly with respect to the mounting base. The at least one retaining member is oriented in a direction generally opposed to the second retaining member. The lid is retained between the at least one retaining member and the second retaining member.

In another embodiment, the device for holding a lid to a cooking container is composed of a mounting base and an elongate sliding member. The mounting base is further composed of a center section, a left wing section, and a right wing section. The center section defines a slot. The left wing section has a first retainer clip and the right wing section has a second retainer clip. The sliding member further has a third retainer clip. The sliding member both travels within and is retained within the slot.

In a further embodiment, the inventive device for holding the lid of a cooking container is composed of a mounting component and a sliding component. The mounting component has a first lateral section, a second lateral section, and a central section disposed between and contiguous with the first lateral section and the second lateral section. A first retainer means extends from the first lateral section and is adapted to engage a rim of the lid. Similarly, a second retainer means extends from the second lateral section and is also adapted to engage the rim of the lid. The sliding component has a third retainer means adapted to engage the rim of the lid. The sliding component is also functionally restrained by the central section to movement in two dimensions.

Other features, utilities, and advantages of various embodiments of the invention will be apparent from the following more particular description of embodiments of the invention as illustrated in the accompanying drawings and defined in the appended claims.

DETAILED DESCRIPTION OF THE INVENTION

The present invention is directed to a novel device for holding lids of cooking pots and pans or other containers. The lid holding device may be used for either temporary or long-term storage of a lid. The lid holding device may accommodate any type of round lid of any diameter as well as other lid shapes including, for example, oval, rectangular, and square shapes. The lid holding device may be mounted to any flat surface, for example, a wall adjacent to a cooking area or a cabinet surface, e.g., an interior cabinet wall or the inside face of a cabinet door.

Figure 1:
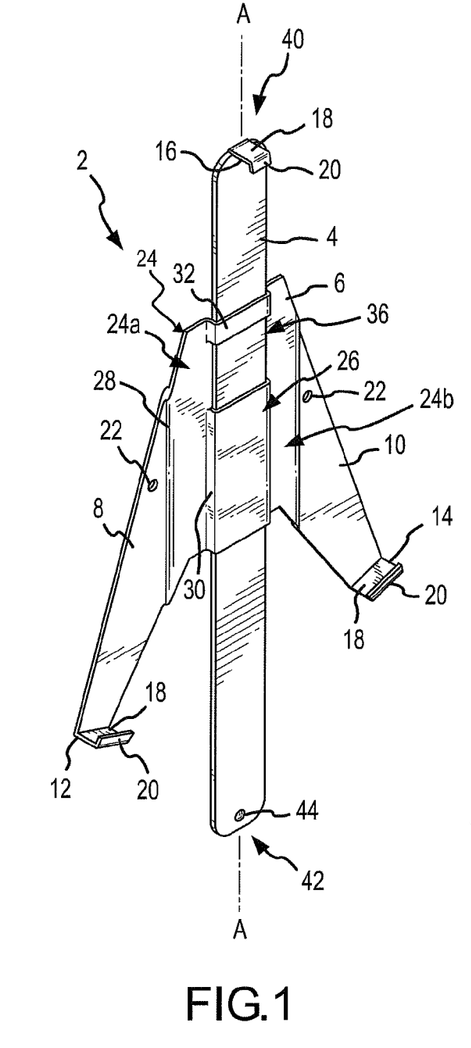
FIG. 1 is a front isometric view of a lid holding device according to one embodiment of the present invention.
Figure 2:
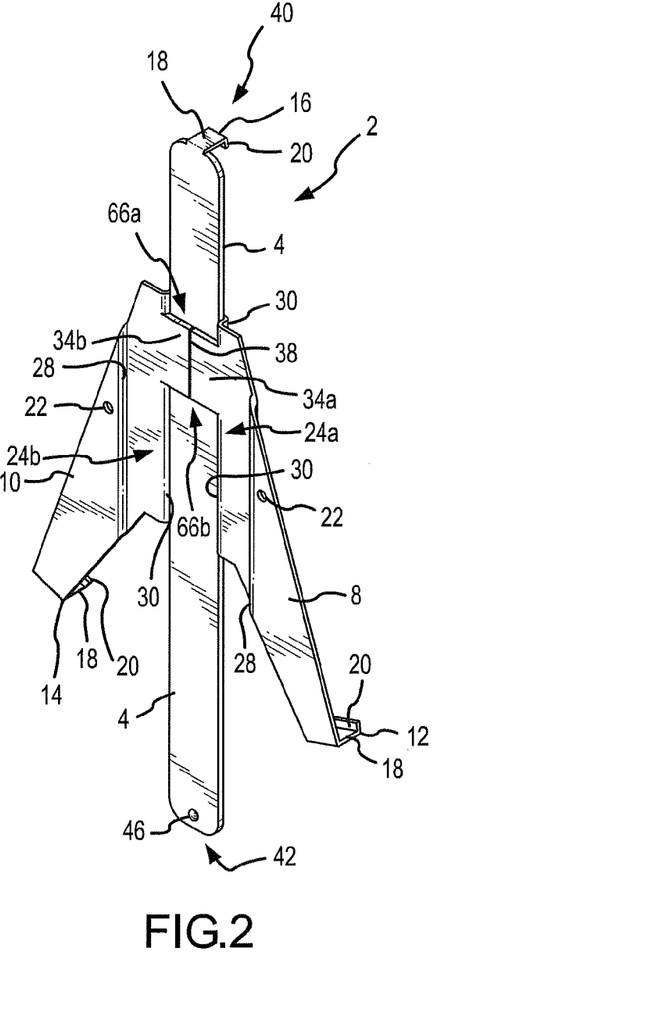
FIG. 2 is a rear isometric view of the lid holding device of FIG. 1.

A lid holding device 2 according to a first embodiment of the invention is depicted in FIGS. 1-6. The lid holding device 2 is composed substantially of two components, a sliding member 4 and a mounting base 6. The sliding member 4 is both retained within and moves linearly with respect to the mounting base 6. The mounting base 6 may be of unitary construction, but functionally composed of multiple sections. As shown in FIGS. 1 and 2, a left wing section 8 extends laterally downward from the left side of the mounting base 6 and a right wing section 10 extends laterally downward from the right side of the mounting base 6. Immediately adjacent to each of the left wing section 8 and the right wing section 10 is an intermediate section 24 of the mounting base 6. The intermediate section 24 comprises a left intermediate section 24a and a right intermediate section 24b, which are connected with the left wing section 8 and the right wing section 10, respectively, by an intermediate transition step 28. The left wing section 8 and the right wing section 10 lie in a common plane. The intermediate section 24 of the mounting base 6 lies in a plane parallel to but spaced apart from the plane which the left wing section 8 and the right wing section 10 define. The intermediate transition step 28 bridges the separation distance between the first plane of the left wing section 8 and the right wing section 10 and the second plane of the intermediate section 24.

Centered between the left wing section 8 and the right wing section 10 is a center section 26 of the mounting base 6. The center section 26 divides the intermediate section 24 in half. A center transition step 30 connects each lateral side of the center section 26 with corresponding halves of the intermediate section 24. The center section 26 lies within a plane parallel to but spaced apart from the plane in which the intermediate section 24 lies. The center transition step 30 bridges the separation distance between the intermediate section 24 and the center section 26. The center section 26 is spatially positioned in front of the intermediate section 24, which in turn is spatially positioned in front of the left wing section 8 and right wing section 10.

The spatial separation between each of the center section 26, the intermediate section 24, and the left and right wing sections 8, 10 ensures adequate clearance between the mounting surface and the sliding member 4. The left and right wing sections 8, 10 are the only portions of the mounting base 6 that contact the mounting surface. Each of the left and right wing sections 8, 10 defines at least one aperture or mounting hole 22 through which a screw, nail, or other fastening device may be inserted to affix the lid holding device 2 to the mounting surface. The sliding member 4 travels within an upper slot 66a and a lower slot 66b formed between the intermediate section 24 and the center section 26 (as further described below), both of which are spaced apart from the mounting surface so as not to disrupt the movement of the sliding member 4.

Figure 3:
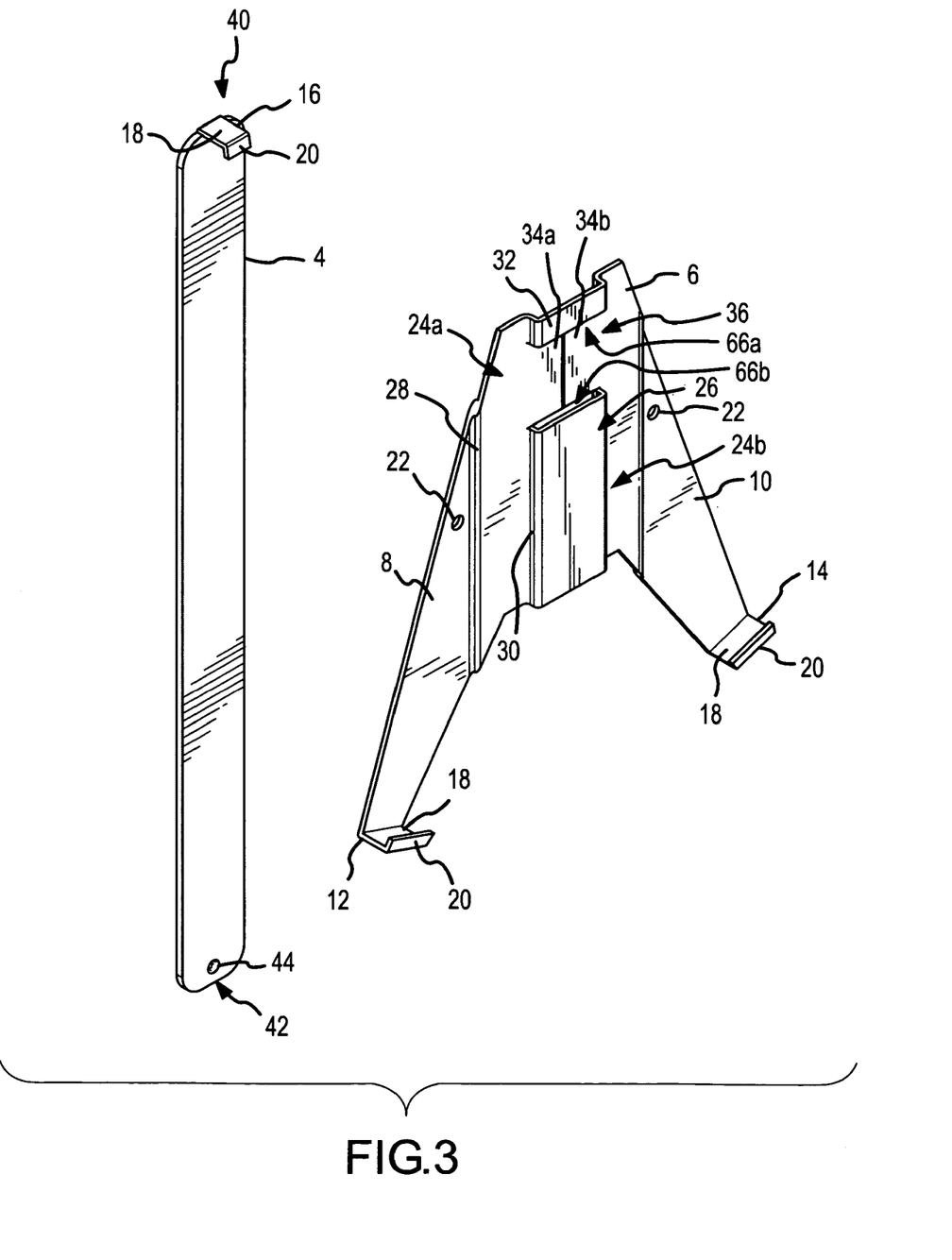
FIG. 3 is an isometric view of the separate components of the lid holding device of FIG. 1.
Figure 4:
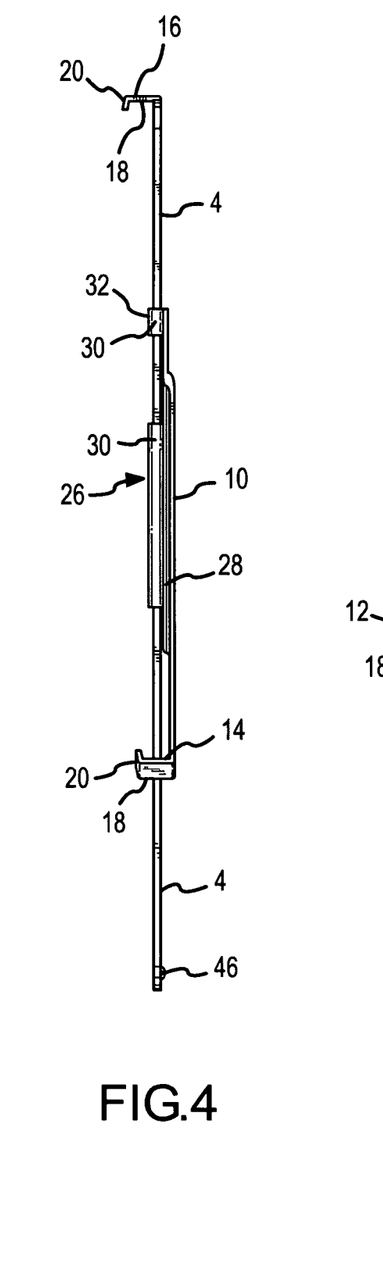
FIG. 4 is a right-side elevation view of the lid holding device of FIG. 1. The left-side elevation view is symmetrical to this FIG. 4.
Figure 5:
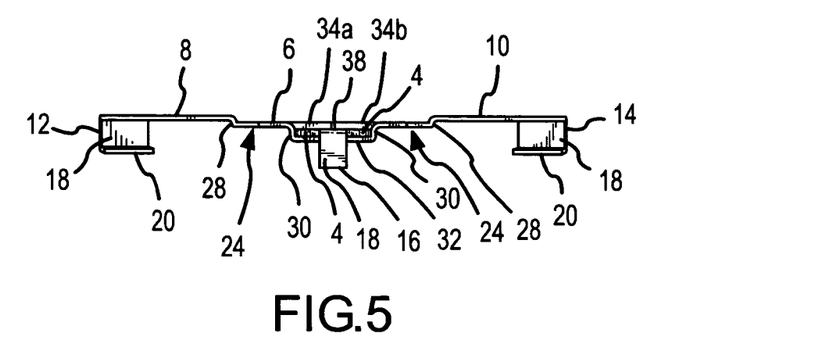
FIG. 5 is a top plan view of the lid holding device of FIG. 1.
Figure 6:
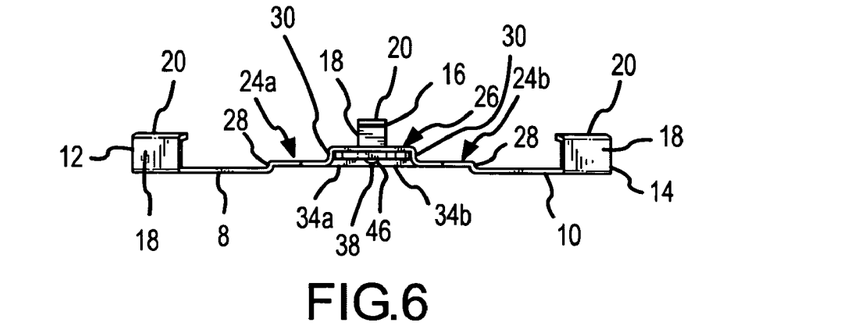
FIG. 6 is a bottom plan view of the lid holding device of FIG. 1.

The center section 26 may be interrupted by a window opening 36, as shown in FIGS. 1 and 3, in this embodiment located in an upper portion of the center section 26. The top of the window opening 36 is defined by a top retention band 32, which is a narrow band of the center section 26 above the window opening 36. The bottom of the window opening 36 is similarly defined by an edge of the center section 26. The sides of the window opening 36 are defined by portions of the intermediate section 24 of the mounting base 6 on either side of the center section 26. The intermediate section 24 extends behind the window opening 36. As shown in FIGS. 2 and 3, a left rear flange 34a extends from the left intermediate section 24a toward the center of the window opening 36. Similarly, a right rear flange 34b extends from the right intermediate section 24b toward the center of the window opening 36. The left rear flange 34a and the right rear flange 34b meet in the center of the window opening to contact each other at a flange seam 38. In the area of the window opening 36, there is no center transition step 30 since the material of the mounting base 6 forming the left intermediate section 24a lies in the same plane as the left rear flange 34a; and, similarly, the right intermediate section 24b lies in the same plane as the right rear flange 34b.

The length of the sliding member 4 is substantially longer than the height of the center section 26. The width of the sliding member 4 is generally coextensive with the width of the center section 26. The height of the intermediate section 24 is generally co-extensive with the height of the center section 26, including the height of the window opening 36 and the top retention band 32, at least where the left intermediate section 24a and the right intermediate section 24b each transition to the center section 26 at the respective center transition steps 30.

The sliding member 4 is retained within the upper slot 66a formed in the mounting base 6 between the top retention band 32 and the left and right rear flanges 34a, 34b of the intermediate section 24 on the rear side of the mounting base 6. The sliding member is further retained within the lower slot 66b formed in the mounting base 6 between the center section 26 below the window opening 36 and the left and right rear flanges 34a, 34b. That portion of the mounting base 6 forming the transition step 30 further retains the sliding member 4 within the mounting base 6 along the length of the mounting base 6 to restrain lateral movement of the sliding member 4. Another way to view the retention of the sliding member 4 within the mounting base 6 is to consider the center section 26 a channel. As depicted from the rear as in FIG. 2, the center transition steps 30 form the walls of a channel while the center section 26, including the top retention band 32, forms the base of the channel. The window opening 36 is an aperture in the channel. The sliding member 4 fits within and travels along the channel. The sliding member 4 is further contained within the channel by the left and right rear flanges 34a, 34b, which extend across the back surface of the sliding member 4 and prevent the sliding member 4 from being lifted out of the channel.

The location and height of the window opening 36, and consequently the height of the left and right rear flanges 34a, 34b, may be varied depending upon the desired effect on the sliding member 4. For example, in the embodiment of FIGS. 1-6, the window opening 36 is positioned in the top portion of the center section 26. This allows the sliding member 4 to travel a greater distance upward than if the window opening were positioned in a lower portion of the center section 26, which would result in retention of a protuberance 46 by the left and right rear flanges 34a, 34b at a much lower point. This would result in a reduction in the diameter of the lid which the lid holding device 2 could hold. It should be apparent that increasing the height of the window opening 36 would have a similar effect. However, it may be desirable to increase the height of the window opening 36 or position the window opening 36 lower in the center section 26 in the event that the sliding member 4 is unstable and wobbles from front to back with respect to the mounting base 6. By providing greater height to either the left and right rear flanges 34a, 34b or increasing the vertical span of the center section 26 above the window opening 36, more surface area contact is created between the sliding member 4 and the left and right rear flanges 34a, 34b, the center section 26, or both, thereby reducing any front to back pitching of the sliding member 4.

The sliding member 4 further has a slider retainer clip 16 at the top 40 of the sliding member 4. This slider retainer clip 16 may interface with the top retention band 32 (as shown to good advantage in FIG. 12), thereby further retaining the sliding member 4 within the mounting base 6. The bottom 42 of the sliding member 4 additionally has the protuberance 46 extending from the rear side of the sliding member 4. The protuberance 46 may interface with the bottom of the left rear flange 34a and right rear flange 34b at the flange seam 38 (as exemplified in FIG. 12), thereby further retaining the sliding member 4 within the mounting base 6. Although retained within the mounting base 6, the sliding member 4 is able to slide linearly in a vertical direction upward until restrained by the interface between the protuberance 46 and the mounting base 6 and downward until restrained by the interface between the slider retain clip 16 and the mounting base 6.

In addition to the slider retainer clip 16 on the top 40 of the sliding member 4, a left wing retainer clip 12 is provided on the bottom of the left wing section 8 and a right wing retainer clip 14 is provided on the bottom of the right wing section 10. Each of the retainer clips 12, 14, 16 is formed by a retainer shelf 18 extending forwardly from the left wing section 8, right wing section 10, or sliding member 4, respectively. Each of the retainer clips 12, 14, 16 is further defined by a retainer lip 20 extending generally orthogonally from the retainer shelf 18 and, therefore, generally parallel with the left wing section 8, right wing section 10, or sliding member 4, respectively. In the case of each of the left wing section 8 and the right wing section 10, the retainer lip 20 extends in a generally upward direction. In the case of the sliding member 4, the retainer lip 20 extends generally downward from the retainer shelf 18. As the left wing section 12 and the right wing section 14 both extend laterally outward from the center section 26 as well as downward, the left wing retainer clip 12 and the right wing retainer clip 14 are each also angled with respect to a vertical axis A parallel to the length of the sliding member 4. The angle of orientation of the left wing retainer clip 12 with respect to the vertical axis A may be equal to and opposite of the angle or orientation of the right wing retainer clip 14 with respect to the vertical axis A.

Figure 7:
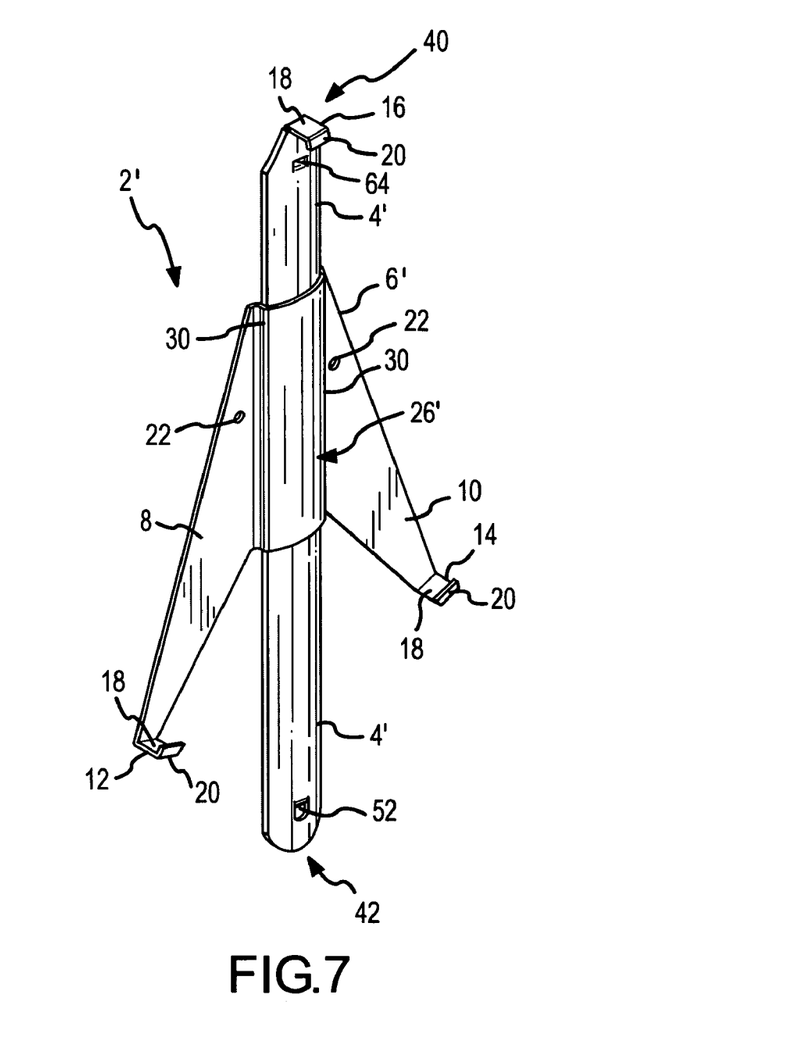
FIG. 7 is an isometric view of a lid holding device according to another embodiment of the invention.
Figure 8:
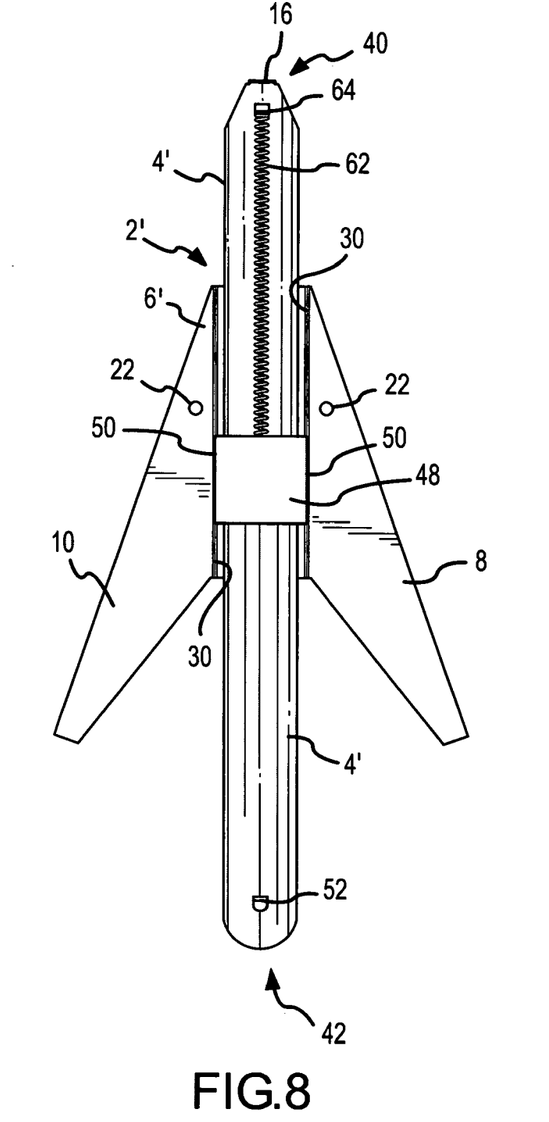
FIG. 8 is a rear elevation view of the lid holding device of FIG. 7.
Figure 9:
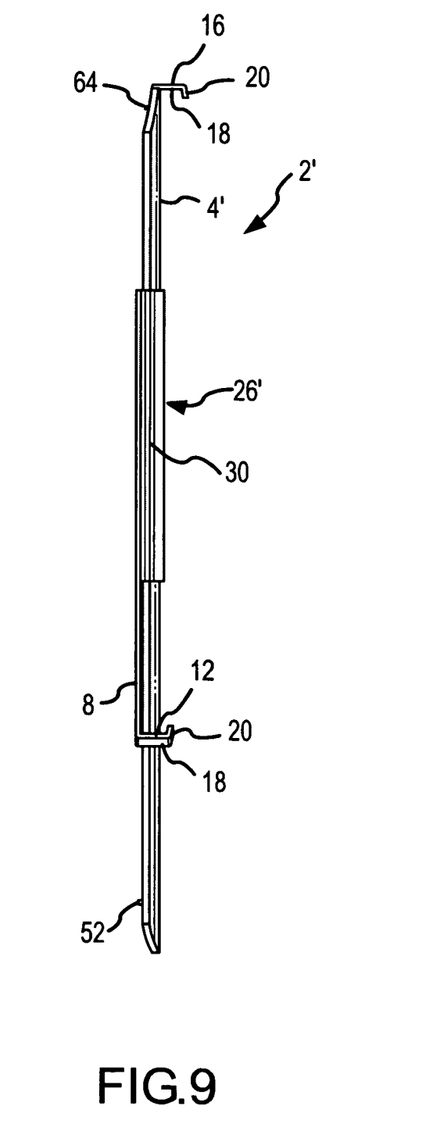
FIG. 9 is a left-side elevation view of the lid holding device of FIG. 7.

A second embodiment of the lid holding device 2' is depicted in FIGS. 7-9. In this embodiment, the sliding member 4' is curved to create a convex surface on the front of the sliding member 4'. The curvature of the sliding member 4' is lateral with a radius of curvature measured from a vertical axis. To accommodate the curved sliding member 4', the center section 26' of the mounting base 6' is similarly curved to create a convex surface on the front of the center section 26'. In this embodiment, there is no intermediate section and the center section 26' transitions directly to the left wing section 8 and the right wing section 10, respectively. The center transition step 30 may also appear less as a definable step, but rather may be a smooth curve transitioning from the left wing section 8 or the right wing section 10 to the curved surface of the center section 26'. The radius of curvature of the center section 26' may match the radius of curvature of the sliding member 4', thereby allowing the sliding member 4' to easily slide within the mounting base 6'.

In this embodiment, the center section 26' may also be solid and not define a window opening. The lid holding device 2' when designed with the solid center section 26' may include an additional component rather than the left rear flange and right rear flange of the first embodiment. As shown in FIG. 8, a retention panel is provided between the left wing section 8 and the right wing section 10 on the rear side of the mounting base 6'. The retention panel 48 may be affixed to left and right wing sections 8, 10 at panel seams 50 by any appropriate means, for example, by welding or adhering, depending upon the material of the retention panel 48 and the mounting base 6'. In the embodiment of FIGS. 7-9, a retention tab 52 may be provided at the bottom 42 of the sliding member 4' in lieu of the protuberance of the preceding embodiment. The retention tab 52 may be of unitary construction with the sliding member 4', for example, a punch-out tab extending rearward from the sliding member 4'. Alternately, a retention tab could be formed by an extension of the bottom of the sliding member 4 bent rearward (not shown). The retention tab 52 may extend rearward an appropriate distance such that the retention tab 52 will interface with and be retained by the retention panel 48, but not so far that the retention tab 52 would interfere with the mounting surface.

In the embodiment shown in FIG. 8, a spring 62 or elastic member may be attached between the sliding member 4' and the mounting base 6'. For example, the spring 62 may be positioned within the concave portion of the sliding member 4' on the rear side of the lid holding device 2'. One end of the spring 62 may be attached near the top 40 of the sliding member 4' by a spring clip 64. The spring clip 64 may be a tab of material punched rearward out of the sliding member 4' and extending into the concave area. The opposite end of the spring 62 may similarly be attached to a clip or tab on the front side of the retention panel (not shown). The spring may provide additional resistance to the sliding member 4' to allow the lid holding device 2' to more securely hold a lid. By positioning the spring 62 in the convex area on the rear side of the sliding member 4', the spring 62 is spaced apart from and will not interfere with either the mounting surface to which the lid holding device 2' is attached or the function of the lid holding device 2' itself.

As depicted in FIG. 8, the retention panel 48 is positioned lower with respect to the center section 26' than the left and right rear flanges of the first embodiment. As noted above with respect to the right and left rear flanges, the lower positioning of the retention panel 48 will reduce the travel distance of the sliding member 4', and thus reduce the diameter of lid which the lid holding device 2' can hold. However, in this instance, the lower position of the retention panel 48 is chosen to allow adequate room for the spring 62 to collapse without interfering with the travel of the sliding member 4'. If a spring were not employed with the present embodiment, it might be appropriate to locate the retention panel 48 further upward with respect to the center section 26' to provide a greater travel distance for the sliding member 4'.

Figure 10A:
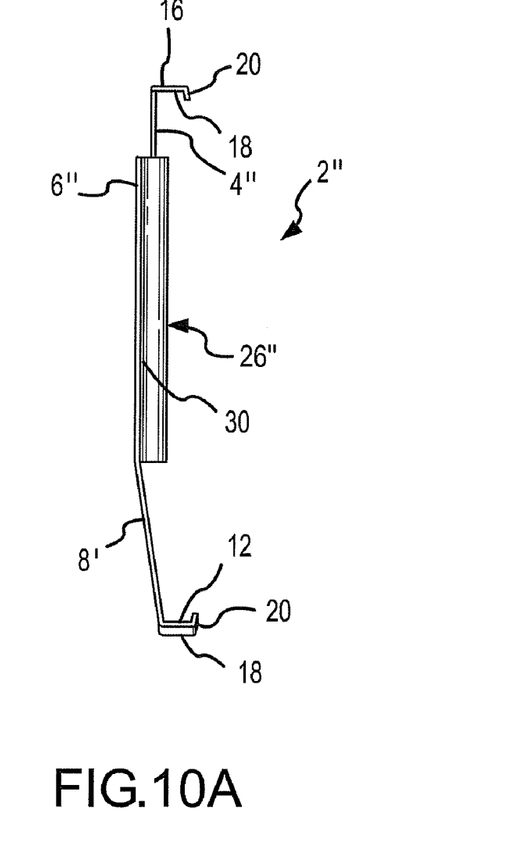
FIG. 10A is a left-side elevation view of an alternate embodiment of a lid holding device with a telescoping sliding member and both the left wing section and right wing section pitched forward.
Figure 10B:
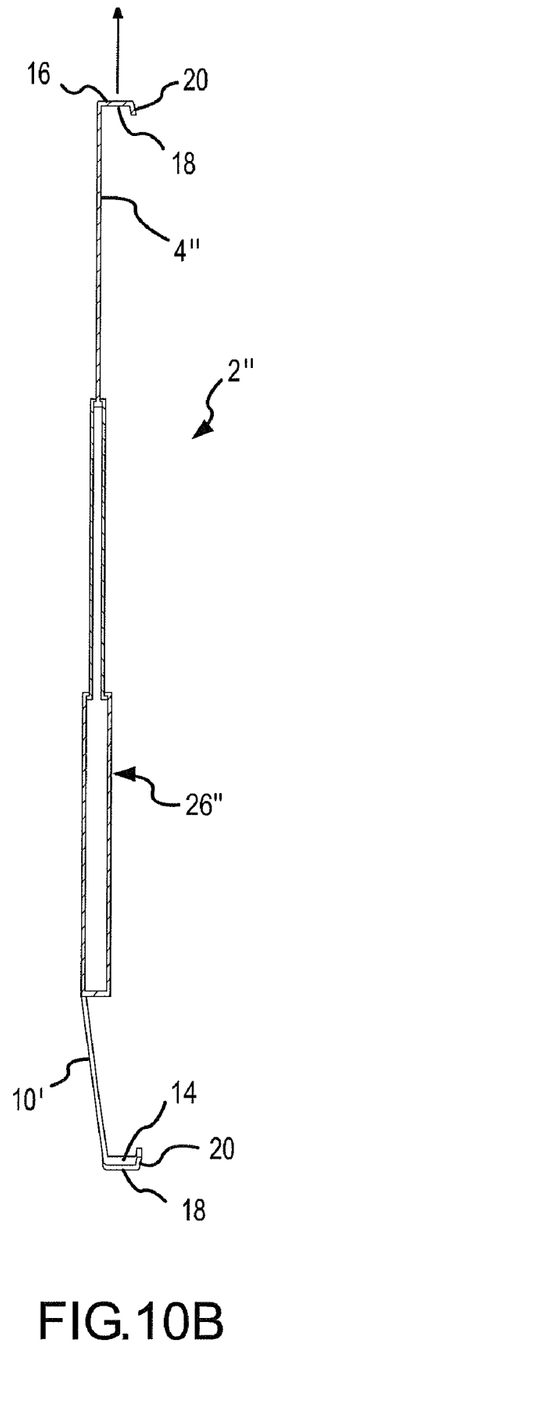
FIG. 10B is a left-side elevation view, in cross-section, of the lid holding device of FIG. 10A with the telescoping sliding member fully extended and the right wing section pitched forward.

A further embodiment of the lid holding device 2" is depicted in FIGS. 10A and 10B. In this embodiment, the sliding member 4" is composed of multiple telescoping sections that extend upward from the center section 26" of the mounting base 6". The telescoping sliding member 4" reduces the vertical profile of the lid holding device 2", thereby decreasing the surface area required for mounting the lid holding device 2". It should be recognized that the left wing and right wing sections could similarly be composed of telescoping sections to either reduce the vertical profile of the lid holding device 2", increase the lid diameter capacity of the lid holding device 2", or both.

It may be observed that the telescoping embodiment of the lid holding device 2" of FIGS. 10A and 10B has a thicker profile than the other embodiments as a result of the nesting of the telescoping sections of the sliding member 4". This increased profile depth causes the slider retainer clip 16 to extend farther forward than the left wing retainer clip 12 and the right wing retainer clip 14. In order to account for the thickness of the mounting base 6", the left wing section 8' and the right wing section 10' may both be bent or pitched forward to place the left wing retainer clip 12 and the right wing retainer clip 14 with the slider retainer clip 16 in a vertical plane parallel to the sliding member 4".

It should be apparent that many of the features described with respect to the second embodiment of the lid holding device of FIGS. 7-9 may be incorporated with the features described with respect to the first embodiment of FIGS. 1-6, and vice-versa. For example, the first embodiment need not have the intermediate section and could be configured with merely the left and right wing sections and the center section. Similarly, the second embodiment could incorporate an intermediate section, a window opening, and/or left and right rear flanges as in the embodiment of FIGS. 1-6. Additionally, the first embodiment could be formed without the window opening and employ a retention panel similar to the second embodiment instead of the left and right rear flanges. Further, the sliding member and center section of the first embodiment could be curved as in the second embodiment. Also, in lieu of the protuberance at the bottom of the sliding member, the first embodiment could employ a retention tab as described with respect to the second embodiment. The first embodiment could also incorporate an elastic member attached between the sliding member and the mounting base in a similar manner as described with respect to the second embodiment. The left and right wing sections in both the first and second embodiments could also be pitched forward to ensure alignment between the slider retainer clip and the left wing and right wing retainer clips.

Figure 11A:
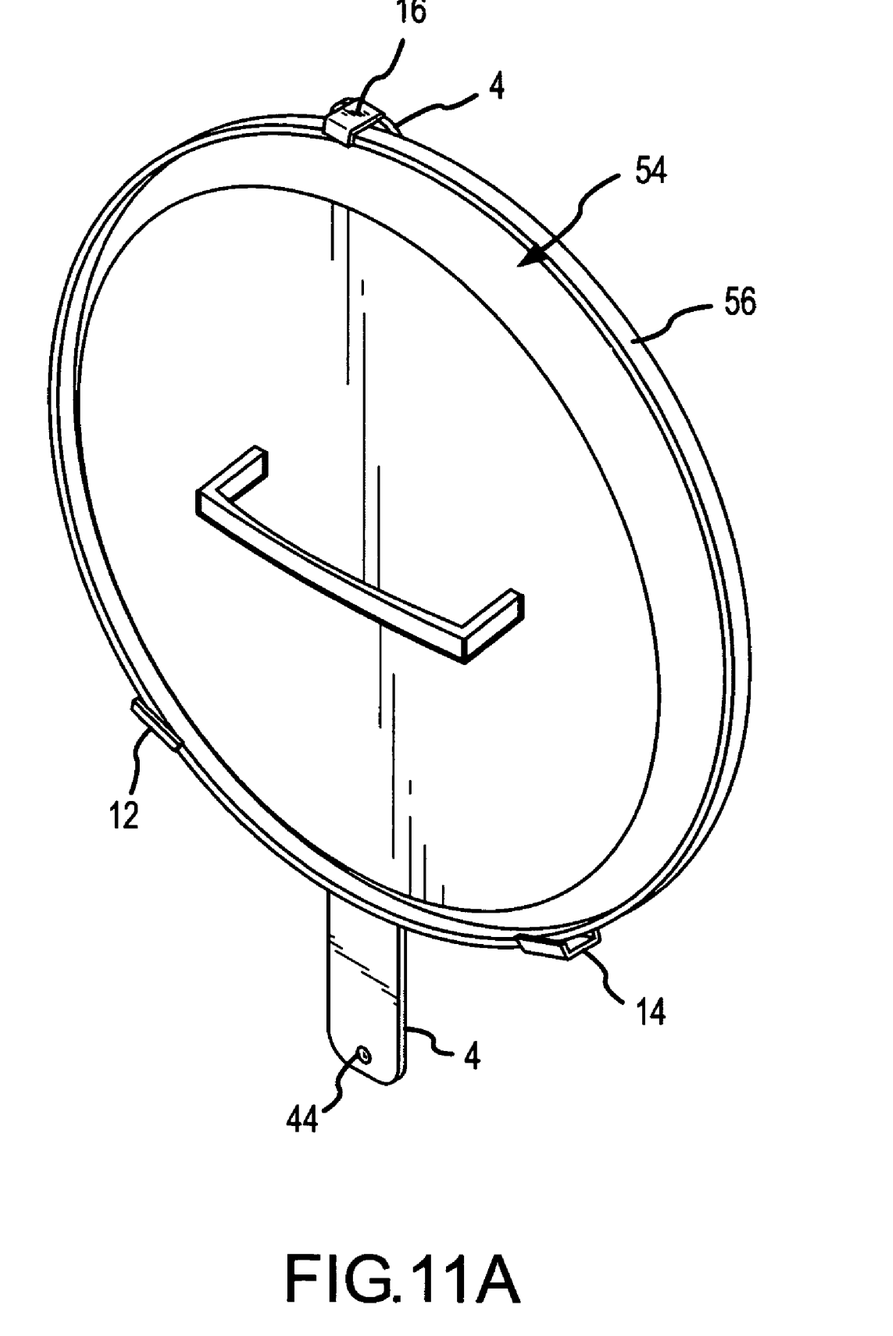
FIG. 11A is an isometric view of the lid holding device of FIG. 1 holding a lid.
Figure 11B:
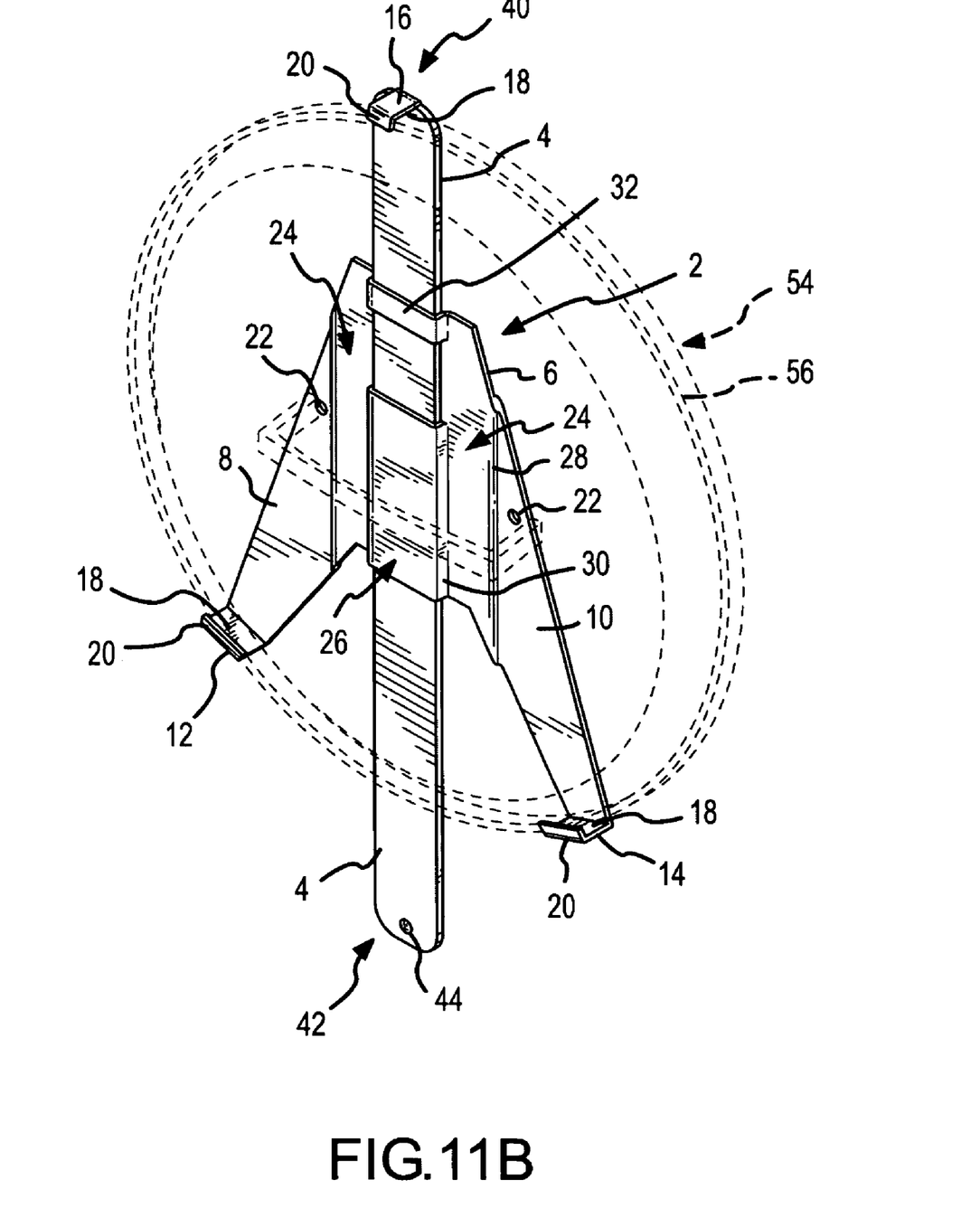
FIG. 11B shows the lid holding device as depicted in FIG. 11A with the lid shown in phantom.

FIGS. 11A and 11B depict lid holding device 2 of the first embodiment holding a lid 54. The rim 56 of the lid 54 is retained at the top by the slider retainer clip 16 and at the bottom by the left wing retainer clip 12 and the right wing retainer clip 14. As shown, each of the left wing retainer clip 12 and the right wing retainer clip 14 is oriented at a pitched angle toward longitudinal center axis A (as indicated in FIG. 1) of the lid holding device 2. The angled position of the left wing retainer clip 12 and the right wing retainer clip 14 allow their respective retainer shelves 18 and retainer lips 20 to engage a greater surface area of the rim 56 and thereby more securely hold the lid 54 in the lid holding device 2.

Figure 12:
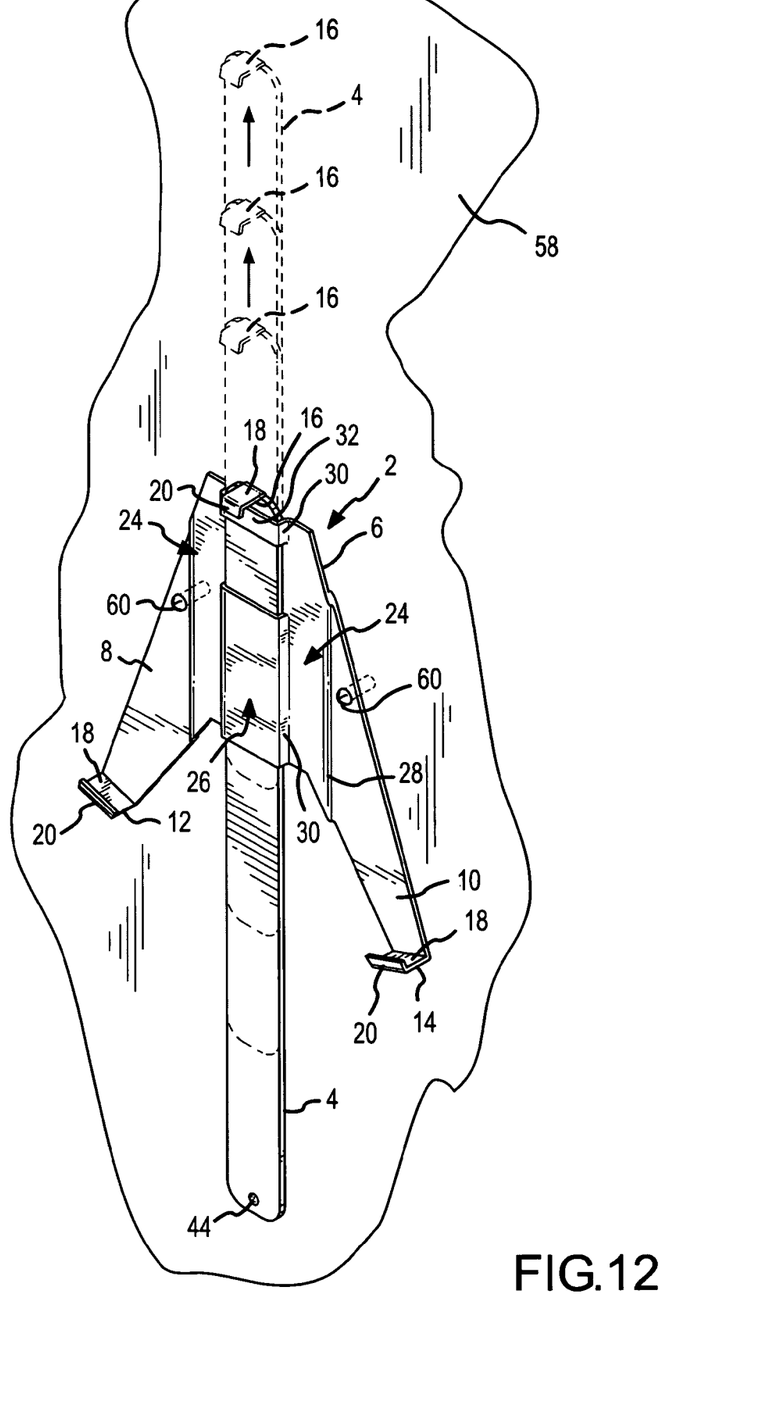
FIG. 12 is an isometric view of the lid holding device of FIG. 1 mounted to a flat surface and further depicting a range of travel of the sliding member.

As depicted in FIG. 12, the lid holding device 2 may be easily mounted to any flat mounting surface 58, for example, a wall, by fastening mounting screws 60 to the mounting surface 58 through the mounting holes 22 in the mounting base 6. The lid holding device 2 is preferably mounted with the sliding member 4 vertically oriented and the top 40 of the sliding member 4 positioned above the mounting base 6. As indicated in FIG. 12, the sliding member 4 has a linear vertical range of motion between a minimal position wherein the slider retainer clip 16 rests upon the top retention band 32 and a maximum position wherein the protuberance 46 is restrained by the left-rear flange 34*a* and the right-rear flange 34*b*. When not holding a lid 54, the sliding member 4 is in its minimal resting position with the slider retainer clip 16 resting against the top retention band 32. The force of gravity returns the sliding member 4 to this resting position when the lid holding device 2 is not holding a lid 54.

The lid 54 may be easily inserted into and removed from the lid holding device 2. The user can insert the lid 54 into the lid holding device 2 by simply engaging the rim 56 of the lid 54 with the retainer shelf 18 and retainer lip 20 of the slider retainer clip 16 on the sliding member 4. Then the user need merely move the lid 54 upward, which simultaneously moves the sliding member 4 in an upward direction. Once the sliding member 4 has been raised a sufficient distance such that the diameter of the lid 54 can fit between each of the slider retainer clips 16, the left wing retainer clip 12, and the right wing retainer clip 14, the user can then lower the lid 54 until the rim 56 of the lid 54 engages the retainer shelf 18 and retainer lip 20 of each of the left wing retainer clip 12 and the right wing retainer clip 14. The force of gravity then holds the lid 54 against the retainer shelves 18 of the left wing retainer clip 12 and the right wing retainer clip 14. Gravity similarly holds the retainer shelf 18 of the slider retainer clip 16 against the rim 56 of the lid 54. The retainer lips 20 of each of the left wing retainer clip 12, the right wing retainer clip 14, and the slider retainer clip 16 prevent the lid 54 from falling forward out of the lid holding device 2.

When inserting the lid 54, the top of the lid 54 is inserted first and engages the slider retainer clip 16 to raise the sliding member 4. When an adequate opening for the diameter of the lid 54 is provided, the bottom of the lid 54 can be placed on the left and right wing retainer clips 12, 14. At this point, the sliding member 4 will be either directly behind the bottom rim 56 of the lid 54 and thus will slide against the rim 56 without impediment, or the bottom of the sliding member 4 will be above the bottom rim 56 (assuming a large diameter lid) and again the sliding member will avoid catching on the lid. A third possibility is that the diameter of the lid 54 is very close to the length of the sliding member 4, such that the bottom of the sliding member 4 is aligned with the left wing and right wing retainer clips 12, 14. If this is the case, the bottom rim 56 of the lid 54 could slip under the sliding member 4 when the sliding member 4 is lifted, allowing the bottom rim 56 of the sliding member 4 to catch on the lid 54 when the sliding member 4 is slightly lowered to a resting position. If the sliding member 4 catches on the rim 56, it may not be able to drop far enough to adequately engage the top rim 56 of the lid 54 to retain the lid 54. In this circumstance, incorporating an embodiment in which the left wing section 8 and right wing section 10 are pitched forward such that the left wing and right wing retainer clips 12, 14 are in the same vertical plane as the slider retainer clip 16 alleviates the problem. When the left and right wing sections 8, 10 are pitched forward, the bottom rim 56 of the lid 54 is spaced apart from the plane of motion of the sliding member 4 and thus the sliding member 4 is prevented from catching on the lid 54

Alternatively, the lid holding device 2' incorporating the spring 62 in the embodiment of FIG. 8 may be mounted in other orientations. Specifically, the sliding member 4' need not be oriented vertically with the slider retainer clip at the top of the lid holding device 2'. Presuming that the spring 62 exerts a sufficient force to overcome the force of gravity on the sliding member 4' attributable to the particular orientation of the lid holding device 2' and the mass of the particular lid 54, the sliding member 4' may be extended and retracted to hold the lid 54. The force of the spring 62 then provides the necessary retention force to retain the lid 54, to the extent that gravity only partially assists or, in some cases, opposes the retention of the lid 54, in the lid retention device 2'.

The lid retention device of the present invention may be composed of any sufficiently rigid material able to both support the weight of the lid and withstand the heat of a hot lid removed from a pot, pan, or other container being heated on a stove, in an oven, or by some other heating device. In one embodiment, the lid holding device may be made out of metal, for example, aluminum, stainless steel, copper, nickel, tin, titanium, or a metal alloy, for example, brass, or any other metal or alloy of sufficient strength, rigidity, and ability to withstand the heat of a hot lid. The lid holding device may be formed by separately casting the sliding member and the mounting base and combining these cast members together. Alternatively, the lid holding device may be formed by cutting or punching basic forms of the sliding member and the mounting base out of sheets of metal. These basic forms may then be punched, pressed, bent or otherwise manipulated to form the various structural pieces of the sliding member and the mounting base.

One exemplary process for forming the lid holding device of FIGS. 1-6 out of sheet metal is described as follows. The basic patterns of the sliding member and the mounting base may be transferred from a template to a sheet of stainless steel. The basic patterns of the sliding member and the mounting base are then cut out of the sheet of metal. Two horizontal slits are then cut in the mounting base pattern at the location of the top and bottom of the window opening. Two vertical slits are then cut from the top horizontal slit to the bottom horizontal slit. The vertical slits are spaced apart from each other a distance equivalent to the combined depth of the center transition steps on each side of the center section. The metal circumscribed by the slits is then removed. The rectangular area from which the metal is removed is centered with respect to the width of the horizontal slits. The mounting base pattern may then be placed into a metal press with a mold in the form of the intermediate section, the center section, left wing section, and the right wing section. The metal press forms the intermediate transition steps and the center transition steps, off-setting the center section, the intermediate section, and the left and right wing sections in parallel planes. Note that if the rectangular area were not removed before pressing, there would be a buckle in the intermediate section behind the window opening because of excess metal material not forced forward to form the center section. The formation of the center transition steps forces the metal of the intermediate section toward the vertical axis and thus closes the gap between the left and right rear flanges previously defined by the rectangular area of metal removed. Each of the retainer clips may next be bent outward from initial tab extensions cut from the sheet metal as part of the patterns of the sliding member and mounting base. The protuberance on the rear side of the sliding member may be formed by a punch from the front side of the sliding member creating an indentation 44 on the front side. The sliding member may then be slid into to slots formed by the window in the mounting base. Significant force may be required to push the protuberance past the left and right rear flanges. However, once the protuberance passes the left and right rear flanges, the protuberance will be retained by the left and right rear flanges under normal usage conditions.

Alternatively, the lid holding device may be manufactured from a plastic or composite material if the lid holding device is to be used merely for storage of a lid. Alternatively, the plastic or composite may be chosen to withstand the heat transferred by the lid when removed from a hot pot or pan and placed into the lid holding device. The plastic or composite may be molded to form the sliding member and the mounting base, which are then coupled together. In an embodiment employing a retention panel as in FIG. 8, the retention panel may be heat fused or ultrasonically welded to the mounting base. In some cases it may be desirable to make the major portions of the sliding member and the mounting base out of plastic or composite that may be unable to withstand the heat, but attach separate retainer clips of metal, plastic, or composite that are designed to withstand heat at the top of the sliding member and at the left wing and right wing. In this manner, greater cost efficiencies in materials may be achieved.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of members and relative movement between members unless otherwise indicated. As such, connection references do not necessarily infer that two members are directly connected and in fixed relation to each other. It is intended that all matter contained in the above description or shown in the accompanying drawings shall be interpreted as illustrative only and not limiting. Changes in detail or structure may be made without departing from the basic members of the invention as defined in the following claims.

What is claimed is:

1. A device for holding a cooking container lid, the device comprising
    a mounting base having
        a center section, wherein the center section defines a slot;
        a left wing section connected with the center section, wherein
            the left wing section further comprises a first retainer clip;
        a right wing section connected with the center section, wherein
            the right wing section further comprises a second retainer clip; and
        an intermediate section disposed between the center section and each of the left
            wing section and the right wing section, wherein
            the center section is contained within a first plane;
            the intermediate section is contained within a second plane;
            the left wing section and the right wing section are both contained within a third plane;
            the first plane, the second plane, and the third plane are parallel to each other;
            the first plane is spaced apart from the second plane;
            the second plane is spaced apart from the third plane; and
            the first plane is spaced apart from the third plane; and
    an elongate sliding member, wherein
        the sliding member further comprises a third retainer clip; and
        the sliding member both travels within and is retained within the slot.

2. The device of claim 1, wherein the mounting base is of unitary construction.

3. The device of claim 2, wherein
    the left wing section is connected with the intermediate section by a first transition step;
    the right wing Section 15 connected with the intermediate section by a second transition step;
    the center section is connected with the intermediate section along a first edge by a third transition step; and
    the center section is connected with the intermediate section along a second edge by a fourth transition step.

4. The device of claim 2, wherein
    the intermediate section further comprises a left flange and a right flange;
    the center section defines a window opening, wherein
        a first portion of the center section extends above the window opening, and
        a second portion of the center section extends below the window opening; and wherein
    the left flange and the right flange extend behind the window opening to meet at a seam.

5. The device of claim 1, wherein the slot is defined by the space between the center section and the intermediate section.

6. The device of claim 1 further comprising a retention panel connected with the intermediate section and positioned opposite the center section, wherein the slot is further defined by the retention panel.

7. The device of claim 1 further comprising
    a retention panel connected with the intermediate section and positioned opposite the center section, wherein the slot is further defined by the retention panel; and
    an elastic member; wherein
    the sliding member is curved about a longitudinal axis to define a convex surface on a rear side of the sliding member;
    the elastic member is attached at a first end to the sliding member;
    the elastic member is attached at a second end to the retention panel; and
    the elastic member is substantially housed within boundaries defined by the convex surface of the sliding member.

8. A device for holding a cooking container lid, the device comprising
    a mounting base having
        a center section, wherein the center section defines a slot;
        a left wing section connected with the center section, wherein
            the left wing section further comprises a first retainer clip; and
        a right wing section connected with the center section, wherein the right wing section further comprises a second retainer clip; and an elongate sliding member, wherein the sliding member further comprises a third retainer clip; and the sliding member both travels within and is retained within the slot; and wherein the center section is spaced apart from the left wing section by a left intermediate section, and the center section is spaced apart from the right wing section by a right intermediate section, wherein both the left and right intermediate sections are in a second plane parallel to the center section in a first plane;

the center section is connected with the left intermediate section along a first edge by a first transition step; and the center section is connected with the right intermediate section along a second edge by a second transition step; and wherein the left wing section and the right wing section each define a mounting aperture.

9. The device of claim 8, wherein the sliding member is curved about a longitudinal axis to define a convex surface on a rear side of the sliding member.

10. The device of claim 9 further comprising an elastic member, wherein the elastic member is attached at a first end to the sliding member;

the elastic member is attached at a second end to the mounting base; and the elastic member is substantially housed within boundaries defined by the convex surface of the sliding member.

11. The device of claim 8, wherein the first retainer clip, the second retainer clip, and third retainer clip each further comprise a corresponding shelf; and a corresponding lip, wherein each corresponding shelf is connected with and generally orthogonal to the right wing section, the left wing section, and the sliding member, respectively; and each corresponding lip is connected with and generally orthogonal to the respective corresponding shelf.

12. The device of claim 8, wherein the first retainer clip is oriented at a first angle with respect to an orientation of the third retainer clip and the second retainer clip is oriented at a second angle with respect to the orientation of the third retainer clip.

13. The device of claim 12, wherein the first angle is equal and opposite to the second angle.

14. The device of claim 8, wherein the sliding member further comprises a retention member, and wherein the third retainer clip is disposed on a first end of the sliding member;

the retention member is disposed on a second end of the sliding member; and the retention member is adapted to engage the mounting base to arrest the travel of the sliding member within the slot.

15. The device of claim 8, wherein the device is composed of a metal or metal alloy selected from the group consisting of: aluminum, stainless steel, copper, nickel, tin, titanium, and brass.

16. The device of claim 8, wherein the device is composed of a plastic or composite material.

17. The device of claim 8, wherein at least one of the sliding member, the left wing section, and the right wing section is adapted to extend telescopically.

\* \* \* \* \*